(12) United States Patent
Canter et al.

(10) Patent No.: US 7,751,566 B2
(45) Date of Patent: Jul. 6, 2010

(54) APPARATUS USING A TIME DIVISION MULTIPLE ACCESS BUS FOR PROVIDING MULTIPLE LEVELS OF SECURITY IN A COMMUNICATIONS SYSTEM

(75) Inventors: Jeffrey B. Canter, West Orange, NJ (US); Michael K. Weller, Stroudsburg, PA (US); Michael T. Zimmer, Lake Hopatcong, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 732 days.

(21) Appl. No.: 11/659,670

(22) PCT Filed: Mar. 31, 2006

(86) PCT No.: PCT/US2006/011720

§ 371 (c)(1),
(2), (4) Date: Feb. 7, 2007

(87) PCT Pub. No.: WO2006/127122

PCT Pub. Date: Nov. 30, 2006

(65) Prior Publication Data

US 2008/0098143 A1    Apr. 24, 2008

Related U.S. Application Data

(60) Provisional application No. 60/684,693, filed on May 26, 2005.

(51) Int. Cl.
   *H04K 1/00* (2006.01)
(52) U.S. Cl. .................. 380/257; 713/166; 713/153
(58) Field of Classification Search ............... 713/166, 713/153; 380/257
   See application file for complete search history.

(56) References Cited

U.S. PATENT DOCUMENTS

2004/0052372 A1* 3/2004 Jakoubek ................. 380/255
2004/0225883 A1* 11/2004 Weller et al. ............. 713/166
2005/0058149 A1* 3/2005 Howe ....................... 370/428

OTHER PUBLICATIONS

Department of Defense Standard, "Department of Defense Trusted Computer System Evaluation Criteria", DoD 5200.28-STD, Dec. 26, 1985.

* cited by examiner

*Primary Examiner*—Michael Pyzocha
*Assistant Examiner*—Paul Callahan
(74) *Attorney, Agent, or Firm*—Daniel J. Long; Leo Zucker (57) ABSTRACT

Systems including both distributed and centralized architectures for providing multiple levels of security using "virtual" switches. Ports and channels are assigned the same time slots on a TDMA bus only when they have matching security levels.

15 Claims, 6 Drawing Sheets

APPARATUS USING A TIME DIVISION MULTIPLE ACCESS BUS FOR PROVIDING MULTIPLE LEVELS OF SECURITY IN A COMMUNICATIONS SYSTEM

CROSS-REFERENCE TO RELATED APPLICATION

The present application claims the benefit of Provisional Application Ser. No. 60/684,693 filed May 26, 2005, and entitled "Bus Architecture for High Assurance Data Interface Switch." The contents of that application are hereby incorporated by reference.

FIELD OF THE INVENTION

The present invention relates generally to a security system for use in a communications system and, more particularly, to a security system that provides multiple levels of security using a time division multiple access bus.

BACKGROUND OF THE INVENTION

Present communications systems, typically bidirectional communications systems, whether for military, industrial or commercial use, or for use between private individuals, typically require separate physical systems for each security level supported. The requirements depend upon the types of information being communicated, and upon the parties involved in the communication.

Different levels of security are defined in DOD 5200.28-STD, entitled "Department Of Defense Trusted Computer System Evaluation Criteria," dated December 1985. In broad terms, the criteria are characterized by four divisions, namely, "A, B, C and D". Division A is the highest protection, and is known as "Verified Protection." The next level is "Division B: Mandatory Protection"; followed by "Division C: Discretionary Protection"; followed by the lowest level "Division D: Minimal Protection." DOD5200.28-STD also provides the mandatory access control requirements for these levels of security.

Particularly in the military field, including the armed forces and DOD, and governmental agencies such as NASA, and many others, hierarchical mandatory access control is required. Similarly, hospitals and commercial companies, for example, may require non-hierarchical mandatory access control to be maintained for their information or material.

Prior U.S. patent application Ser. No. 10/837,790, filed May 3, 2004, entitled "METHOD AND APPARATUS PROVIDING MULTIPLE SINGLE LEVELS OF SECURITY FOR DISTRIBUTED PROCESSING IN COMMUNICATIONS SYSTEMS", and assigned to the assignee of the present invention, describes the use of Multiple Single Levels of Security (MSLS) in the Joint Tactical Radio System, known under the acronym JTRS. The known MSLS systems require involved security certifications, and typically have inadequate networking capability. Accordingly, the inventors of the prior application recognized that there was a need in the art for a MSLS system capable of meeting all of the security requirements of such systems, in addition to permitting the distribution of intelligence or secure information or material in a manner minimizing security certification efforts, while providing networking functionality between channels operating with the same security label. They further recognized that there was a need for such MSLS records and apparatus not only for JTRS systems, but also for use in any applicable communications system requiring MSLS. The prior application thus discloses a system wherein a physical switch provides multiple single levels of security. However, in the system disclosed in the prior application, all switching was centralized and required that separate cabling be run from the central control to all the individual ports and channels of the communications system. The inventors of the present system have recognized that it would be more efficient and economical if only a single cable was used to connect all the ports and channels of the communications system. Also, the prior invention required physical separation of signals, limiting the number of possible connections to the available routing resources. It would therefore be desirable to use bandwidth resources instead, allowing for a larger number of interconnects in the same resource space.

SUMMARY OF THE INVENTION

According to the present invention, there is provided a system providing communication at multiple levels of security for associated apparatus. The associated apparatus includes a plurality of ports and a plurality of channels, wherein each of the ports and channels is assigned transmit and receive time slots and each of the ports is only permitted to communicate with a channel having matching time slots. The system comprises a data bus for connection to all of the ports and channels, a control bus (which could share the same physical resources as the data bus) for connection to all of the ports and channels, a plurality of switch units each associated with a respective one of the ports and channels and each coupled between the bus and the respective one of the ports and channels, a clock and sync circuit coupled to the busses, and a high assurance control source connected to the control bus. The clock and sync circuit is operative to provide configuration signals on the data bus to define a plurality of time slots. The high assurance source is operative to assign a transmit time slot and a receive time slot to a selected port switch unit, and assign a transmit time slot and a receive time slot to a selected channel switch unit. The high assurance source ensures that a transmit time slot for a selected port switch unit is the same as a receive time slot for a selected channel switch unit and a receive time slot for the selected port switch unit is the same as a transmit time slot for the selected channel switch unit only when the port associated with the selected port switch unit and the channel associated with the selected channel switch unit have a matching designated security level.

Thus, the present invention uses a "virtual" switch (i.e., time division) which is dedicated to only a single level of security. Multiple switches provide multiple levels of security.

The inventive system architecture can be either distributed or central, and in each case can either have separate control and data buses or can use a single time division bus for both control and data transmission.

BRIEF DESCRIPTION OF THE DRAWINGS

The foregoing will be more readily apparent from reading the following description in conjunction with the drawings in which like elements in different figures are identified by the same reference numeral and wherein.

DETAILED DESCRIPTION

Figure 1:
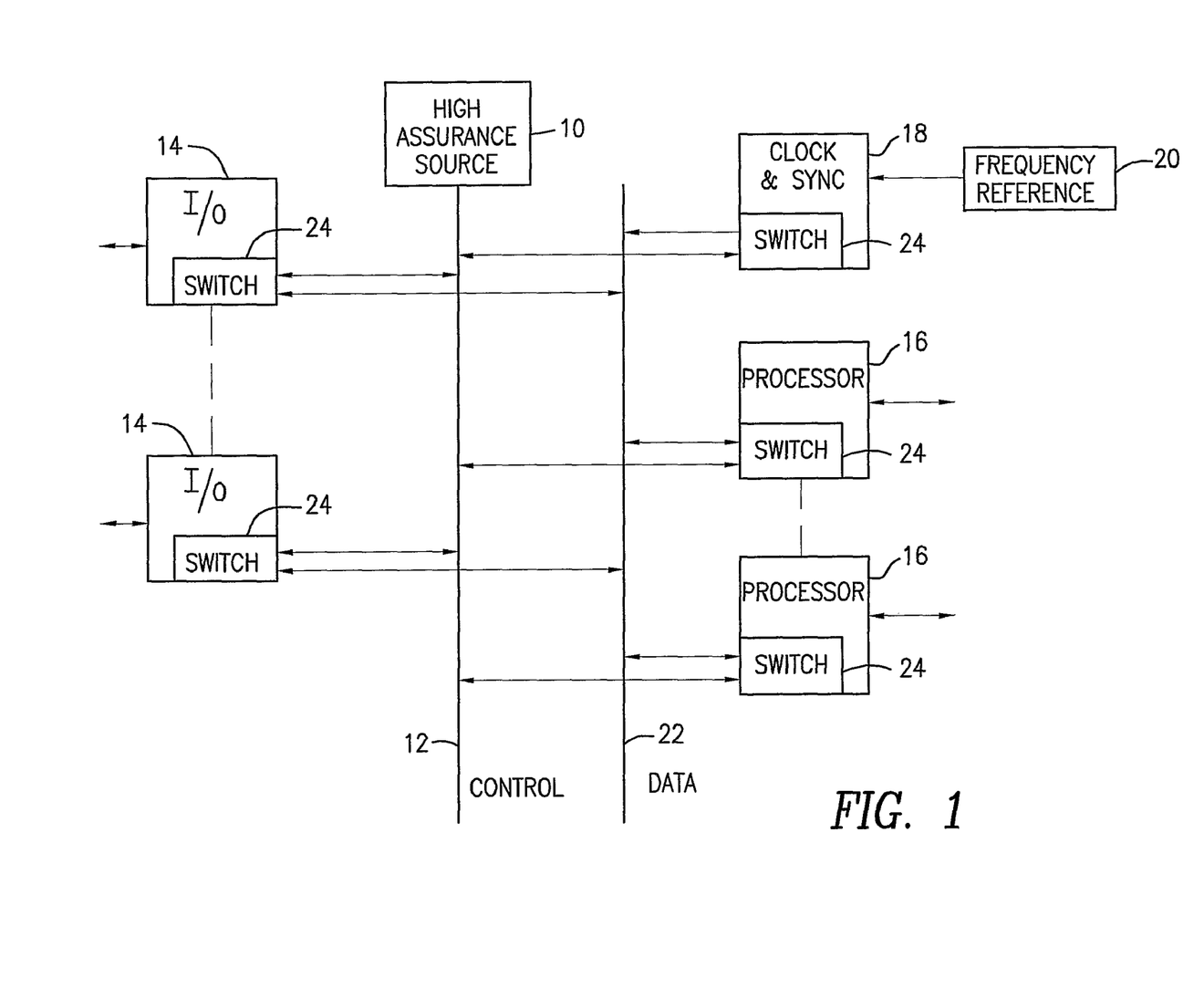
FIG. 1 is a block diagram depicting a first illustrative embodiment of a system according to the present invention having a distributed architecture with separate control and data buses.

FIG. 1 illustrates the present invention as applied to a system having a distributed architecture with separate serial control and data buses. Under certain circumstances, the use of a serial bus is advantageous over the use of separate cabling to a plurality of peripheral devices because only a single cable has to be run to connect to all of the peripheral devices. System control is effected by the high assurance source 10, which ensures that only those peripheral devices having the same designated security level can communicate with each other. Thus, the high assurance source 10 is connected to the control bus 12, which is a serial bus extending to all the peripheral devices of the system. In FIG. 1, the peripheral devices are the ports 14, shown on the left side of the control bus 12 and labeled "I/O", and the channels 16, shown on the right side of the control bus 12 and labeled "PROCESSOR". In addition, there is a clock and sync circuit 18 connected to the control bus 12 and receiving input signals from a frequency reference circuit 20. The system also includes a separate serial time division multiple access (TDMA) data bus 22 extending to all the ports 14 and the channels 16, as well as to the clock and sync circuit 18. The clock and sync circuit 18 is operative to provide configuration signals on the data bus 22 to define a plurality of time slots.

Figure 4:
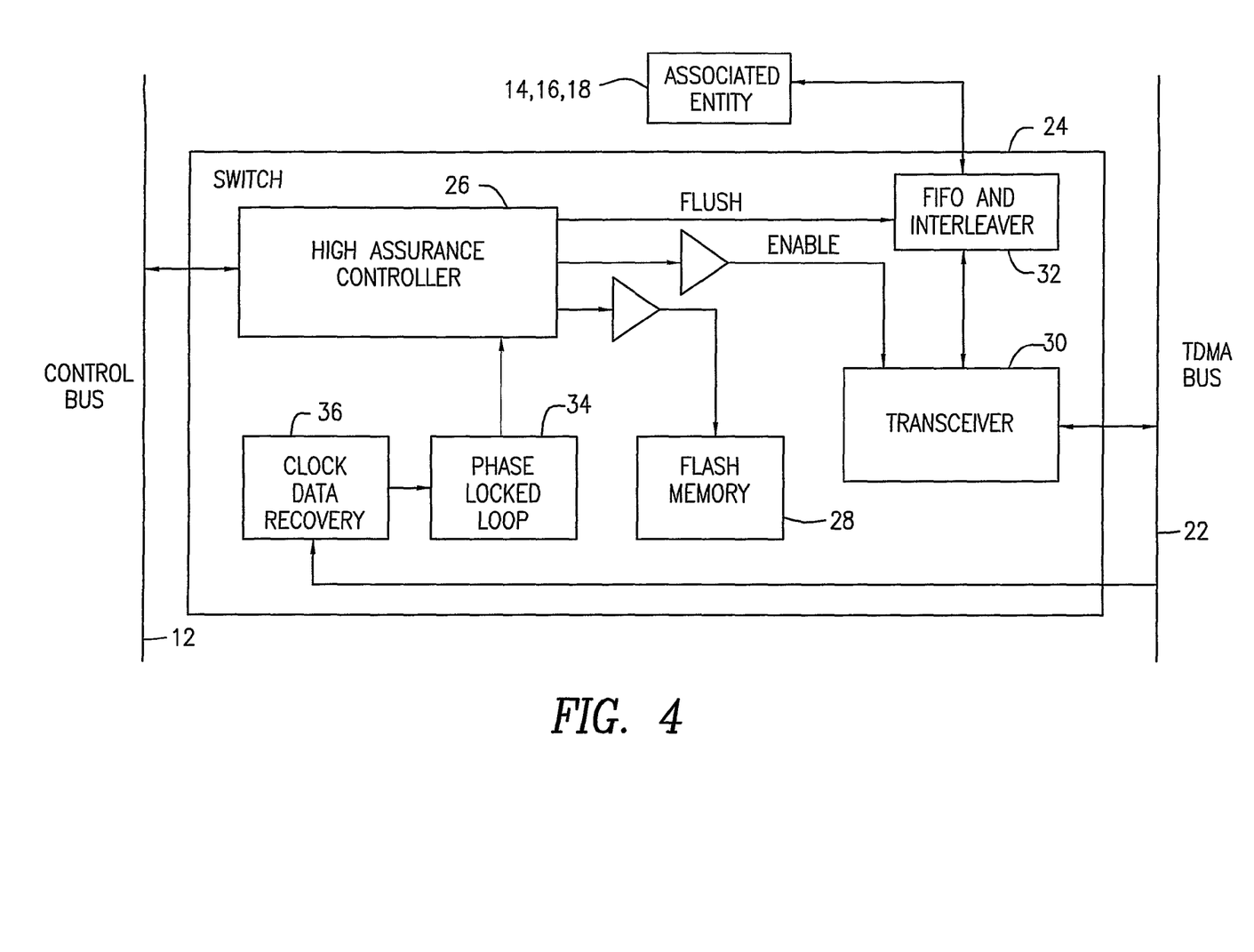
FIG. 4 is a block diagram of an illustrative embodiment of a switch unit according to the present invention which may be utilized in the system shown in FIG. 1.

Each of the peripheral devices (each also hereinafter referred to as an "entity") 14, 16, 18 has an internal switch unit 24 which provides the direct, and only, connection between each associated entity and the buses 12 and 22. As shown in FIG. 4, each switch unit 24 includes a controller 26 for receiving time slot assignments (both receive and transmit) over the control bus 12 from the high assurance source 10, and a memory 28 for storing the time slot assignments. The switch unit 24 also includes a transceiver 30 coupled to the data bus 22 and a first-in-first-out (FIFO) register and interleaver 32 coupled between the transceiver 30 and the associated entity 14,16,18. The phase locked loop circuit 34 and the clock data recovery circuit 36 retrieve timing signals over the data bus 22 from the clock and sync circuit 18.

In operation, when a particular port 14 desires to communicate with a particular channel 16, the high assurance source 10 checks to see if that port and channel have the same designated security level. If not, a connection is not set up. If the security levels match, the high assurance source 10 assigns, over the control bus 12, receive and transmit time slots to the port and channel switch units of those particular port and channel. Thus, the receive time slot for the port switch unit is the transmit time slot for the channel switch unit, and the transmit time slot for the port switch unit is the receive time slot for the channel switch unit. Each entity is only connected to the data bus 22 during its allotted time slots. For networking, one transmitter and multiple receivers are allowable, provided that the security levels match.

Figure 2:
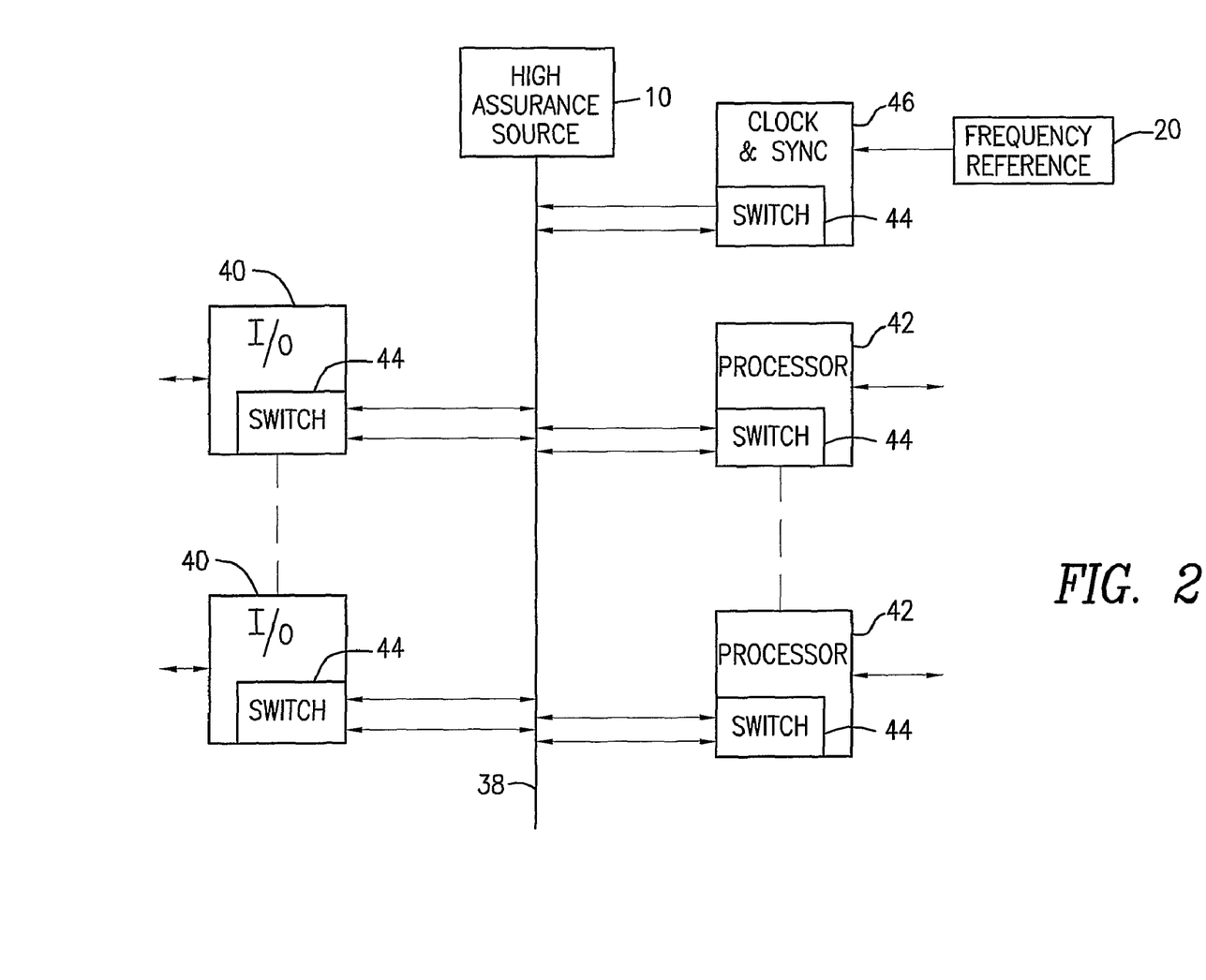
FIG. 2 is a block diagram depicting a second illustrative embodiment of a system according to the present invention having a distributed architecture with a single bus for both control and data.

FIG. 2 illustrates the present invention as applied to a system having a distributed architecture, as in FIG. 1, but with only a single serial TDMA bus 38 carrying both data and control. As in the system of FIG. 1, control is effected by the high assurance source 10. The ports 40 and the channels 42 are connected to the bus 38, each through its own internal switch unit 44. In addition, the clock and sync circuit 46, which is connected to the frequency reference circuit 20, is also connected to the bus 38 through its internal switch unit 44.

Figure 5:
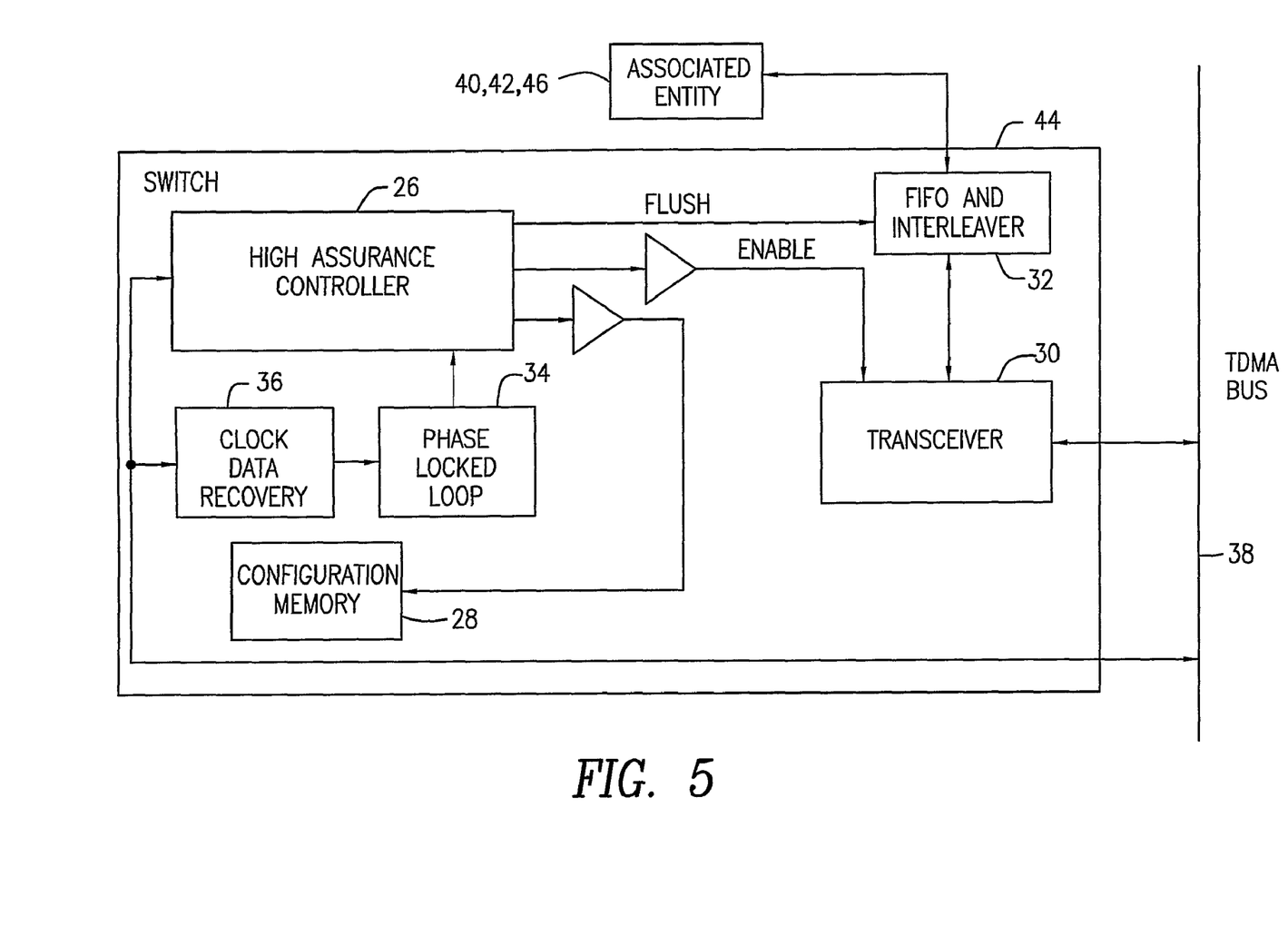
FIG. 5 is a block diagram of an illustrative embodiment of a switch unit according to the present invention which may be utilized in the system shown in FIG. 2.

An exemplary switch unit 44 is illustrated in FIG. 5, from which it can be seen that the switch unit 44 is substantially the same as the switch unit 24 illustrated in FIG. 4, with the only substantial difference being that the switch unit 44 is connected to only the single bus 38, rather than to the two separate data and control buses 22 and 12.

In operation, the system of FIG. 2 operates substantially the same as the system of FIG. 1, except that control, clock and data signals all travel over the single TDMA bus 38.

Figure 3:
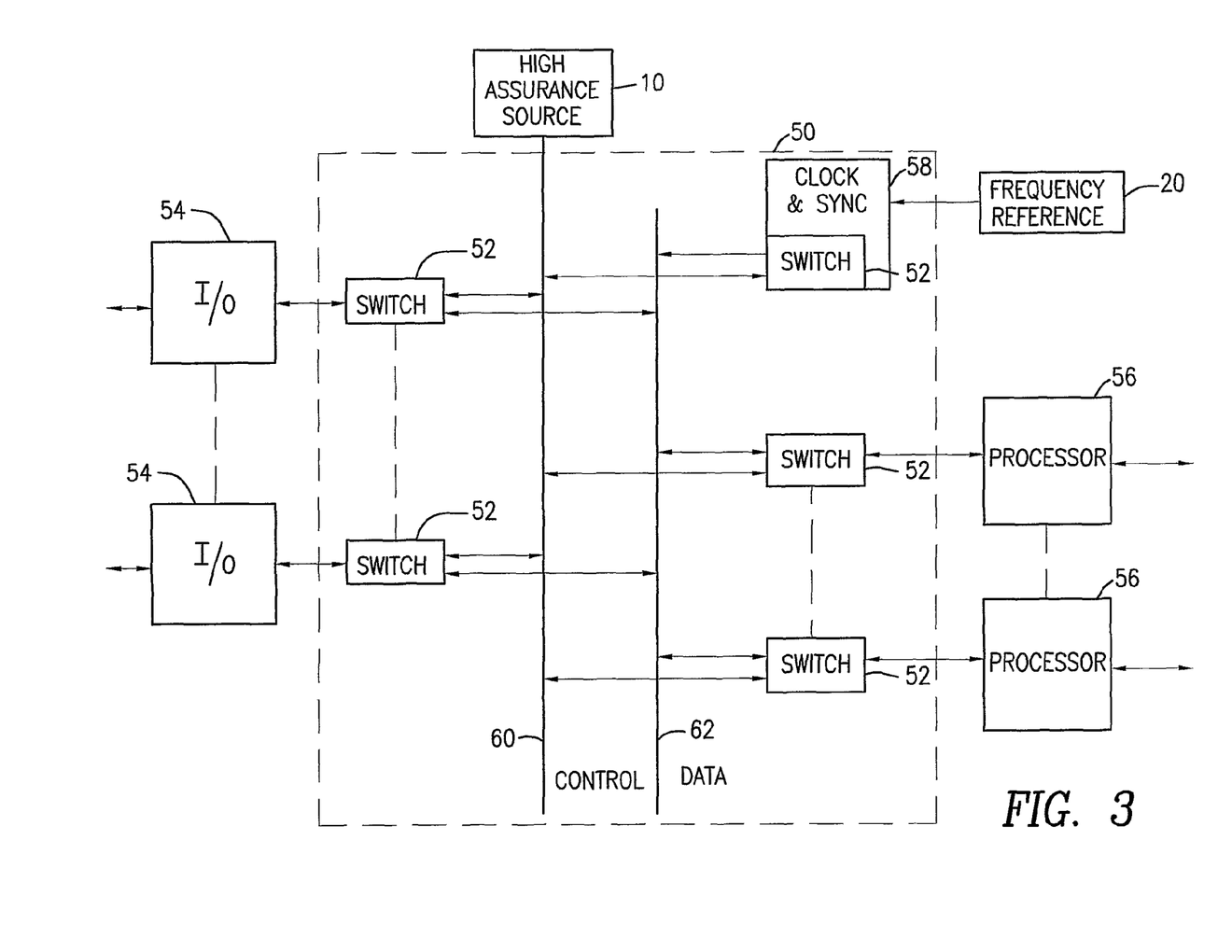
FIG. 3 is a block diagram depicting an illustrative embodiment of a system according to the present invention having a centralized architecture.

FIG. 3 illustrates the present invention as applied to a system having a centralized architecture. In the system of FIG. 3, the circuitry 50 within the broken lines, and to which the high assurance source 10 is connected, may be implemented by an application specific integrated circuit (ASIC). Thus, the ASIC 50 is connected through its internal switch units 52 to the ports 54 and the channels 56. In addition, the internal clock and sync circuit 58 is connected to the external frequency reference 20. The high assurance source 10 is connected to the control bus 60 within the ASIC 50, and all the switch units 52 are connected to the control bus 60 and the data bus 62 within the ASIC 50. Preferably, the buses 60 and 62 are parallel TDMA buses, which greatly increases throughput as compared with the serial buses of the systems shown in FIGS. 1 and 2.

Figure 6:
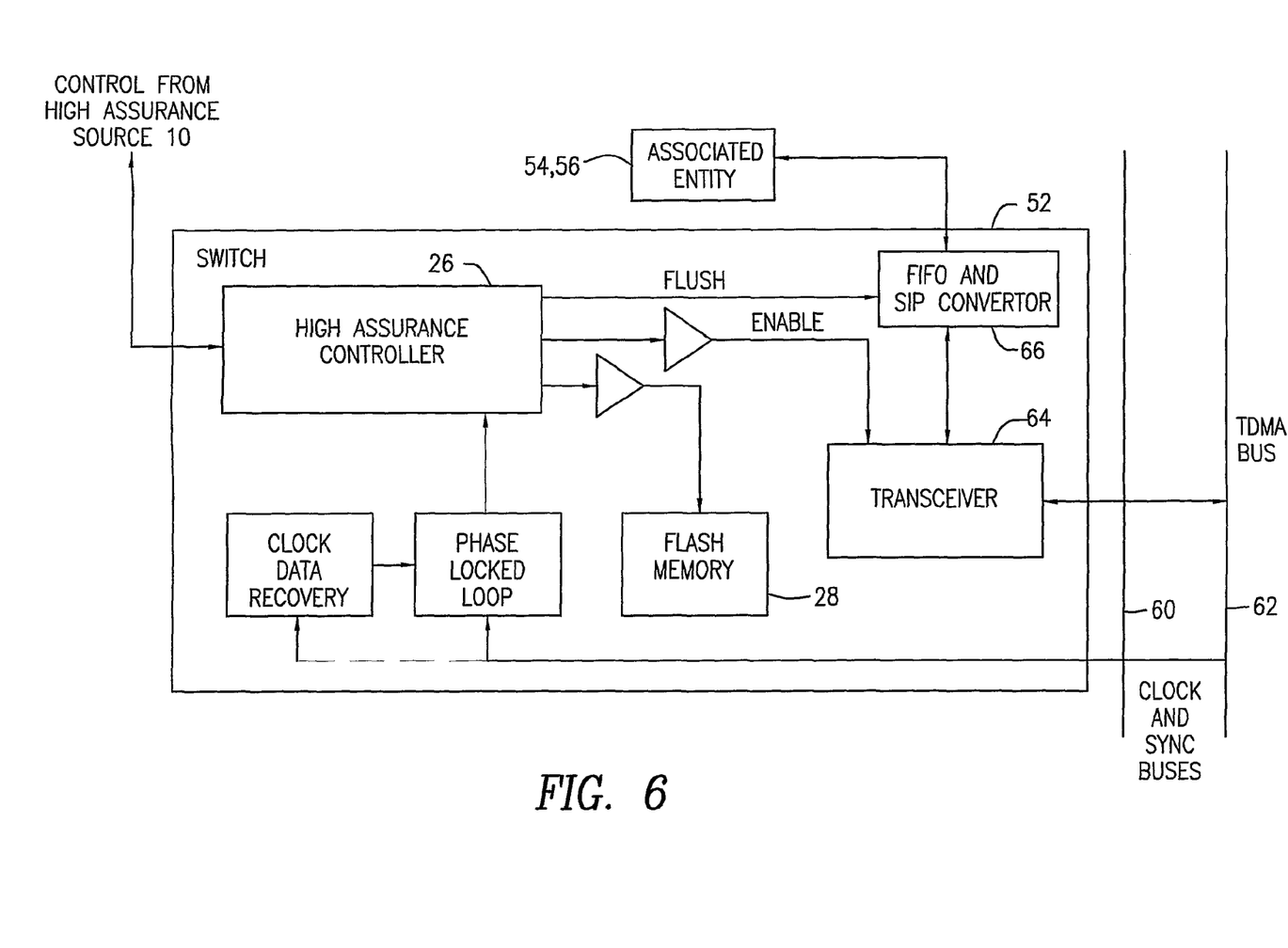
FIG. 6 is a block diagram of an illustrative embodiment of a switch unit according to the present invention which may be utilized in the system shown in FIG. 3.

An exemplary switch unit 52 is illustrated in FIG. 6, from which it can be seen that the switch unit 52 is similar to the switch units 24 and 44. One difference is that the transceiver 64 has parallel connections to the data bus 62. Further, a first-in-first-out register and serial-to-parallel converter 66 is coupled between the transceiver 64 and the associated entity 54,56.

In operation, the system of FIG. 3 operates substantially the same as the systems of FIGS. 1 and 2.

Accordingly there have been disclosed both distributed and centralized architecture embodiments of the present invention. While exemplary embodiments of the present invention have been disclosed herein, it will be appreciated by those of skill in the art that various adaptations and modifications to the disclosed embodiments are possible, and it is therefore intended that this invention be limited only by the scope of the appended claims.

What is claimed is:

1. A system providing communication at multiple levels of security for associated apparatus, said associated apparatus including a plurality of ports and a plurality of channels, wherein each of said ports and channels is labeled with a respective designated security level and each of said ports is only permitted to communicate with a channel having a predetermined designated security level matching the designated security level of said each of said ports, said system comprising;

a bus for connection to all of said ports and channels;
a plurality of switch units each associated with a respective one of said plurality of ports and channels and each coupled between said bus and said respective one of said plurality of ports and channels;
a clock and sync circuit operative to provide configuration signals on said bus to define a plurality of time slots; and
a high assurance source connected to said bus and operative to:
  a) assign a transmit time slot and a receive time slot to a selected port switch unit; and
  b) assign a transmit time slot and a receive time slot to a selected channel switch unit;
wherein a transmit time slot for said selected port switch unit is the same as a receive time slot for said selected channel switch unit, and a receive time slot for said selected port switch unit is the same as a transmit time slot for said selected channel switch unit, only when the port associated with said selected port switch unit and the channel associated with said selected channel switch unit have a matching designated security level; and
wherein:
said bus includes a data bus and a control bus;
said clock and sync circuit is operative to provide said configuration signals on said data bus; and
said high assurance source is operative to assign said time slots to said port switch units and said channel switch units over said control bus.

2. A system providing communication at multiple levels of security for associated apparatus, said associated apparatus including a plurality of ports and a plurality of channels, wherein each of said ports and channels is labeled with a respective designated security level and each of said ports is only permitted to communicate with a channel having a predetermined designated security level matching the designated security level of said each of said ports, said system comprising:
a bus for connection to all of said ports and channels;
a plurality of switch units each associated with a respective one of said plurality of ports and channels and each coupled between said bus and said respective one of said plurality of ports and channels;
a clock and sync circuit operative to provide configuration signals on said bus to define a plurality of time slots; and
a high assurance source connected to said bus and operative to:
  a) assign a transmit time slot and a receive time slot to a selected port switch unit; and
  b) assign a transmit time slot and a receive time slot to a selected channel switch unit;
wherein a transmit time slot for said selected port switch unit is the same as a receive time slot for said selected channel switch unit, and a receive time slot for said selected port switch unit is the same as a transmit time slot for said selected channel switch unit, only when the port associated with said selected port switch unit and the channel associated with said selected channel switch unit have a matching designated security level; and
wherein each of said plurality of switch units includes:
a controller for receiving time slot assignments transmitted over said bus from said high assurance source;
a memory for storing the time slot assignments;
a transceiver coupled between said bus and said associated port or channel; and
clock data recovery means for retrieving timing signals from said bus.

3. A system providing communication at multiple levels of security for associated apparatus, said associated apparatus including a plurality of ports and a plurality of channels, wherein each of said ports and channels is labeled with a respective designated security level and each of said ports is only permitted to communicate with a channel having a predetermined designated security level matching the designated security level of said each of said ports, said system comprising:
a bus for connection to all of said ports and channels;
a plurality of switch units each associated with a respective one of said plurality of ports and channels and each coupled between said bus and said respective one of said plurality of ports and channels;
a clock and sync circuit operative to provide configuration signals on said bus to define a plurality of time slots; and
a high assurance source connected to said bus and operative to:
  a) assign a transmit time slot and a receive time slot to a selected port switch unit; and
  b) assign a transmit time slot and a receive time slot to a selected channel switch unit;
wherein a transmit time slot for said selected port switch unit is the same as a receive time slot for said selected channel switch unit, and a receive time slot for said selected port switch unit is the same as a transmit time slot for said selected channel switch unit, only when the port associated with said selected port switch unit and the channel associated with said selected channel switch unit have a matching designated security level; and
wherein each of said plurality of switch units is located with its respective associated one of said ports and channels.

4. The system according to claim 3 wherein:
said bus is a serial bus including a data bus and a control bus;
said clock and sync circuit is operative to provide said configuration signals on said data bus; and
said high assurance source is operative to assign said time slots to said port switch units and said channel switch units over said control bus.

5. The system according to claim 4 wherein each of said plurality of switch units includes:
a controller for receiving time slot assignments transmitted over said control bus from said high assurance source;
a memory for storing the time slot assignments;
a transceiver coupled to said data bus;
a first-in-first-out (FIFO) register and interleaver coupled between said transceiver and said associated port or channel; and
clock data recovery means for retrieving timing signals from said data bus.

6. The system of claim 3, wherein said bus is in the form of a time division multiple access (TDMA) bus.

7. The system of claim 6, wherein the TDMA bus is configured to operate as a serial TDMA bus.

8. A system providing communication at multiple levels of security for associated apparatus, said associated apparatus including a plurality of ports and a plurality of channels, wherein each of said ports and channels is labeled with a respective designated security level and each of said ports is only permitted to communicate with a channel having a predetermined designated security level matching the designated security level of said each of said ports, said system comprising:
a bus for connection to all of said ports and channels;
a plurality of switch units each associated with a respective one of said plurality of ports and channels and each coupled between said bus and said respective one of said plurality of ports and channels;

a clock and sync circuit operative to provide configuration signals on said bus to define a plurality of time slots; and a high assurance source connected to said bus and operative to:
  a) assign a transmit time slot and a receive time slot to a selected port switch unit; and
  b) assign a transmit time slot and a receive time slot to a selected channel switch unit;

wherein a transmit time slot for said selected port switch unit is the same as a receive time slot for said selected channel switch unit, and a receive time slot for said selected port switch unit is the same as a transmit time slot for said selected channel switch unit, only when the port associated with said selected port switch unit and the channel associated with said selected channel switch unit have a matching designated security level; and wherein each of said plurality of switch units and said bus are located at a central location.

9. The system according to claim 8 wherein;
said bus is a parallel bus including a data bus and a separate clock and sync bus;
said clock and sync circuit is operative to provide said configuration signals on said clock and sync bus; and
said high assurance source is operative to assign said time slots to said port switch units and said channel switch units directly to each of said plurality of switch units.

10. The system according to claim 9 wherein each of said plurality of switch units includes:
  a controller for receiving time slot assignments from said high assurance source;
  a memory for storing the time slot assignments;
  a transceiver coupled to said data bus;
  a first-in-first-out (FIFO) register and serial-to-parallel converter coupled between said transceiver and said associated port or channel; and
  clock data recovery means for retrieving timing signals from said clock and sync bus.

11. The system of claim 8, wherein said bus is in the form of a time division multiple access (TDMA) bus.

12. The system of claim 11, wherein the TDMA bus is configured to operate as a parallel TDMA bus.

13. The system of claim 8, wherein said switch units and said bus are implemented by an application specific integrated circuit (ASIC) at the central location.

14. The system of claim 13, wherein said bus is in the form of a time division multiple access (TDMA) bus.

15. The system of claim 14, wherein the TDMA bus is configured to operate as a parallel TDMA bus.

* * * * *